United States Patent
Trofimenko et al.

(10) Patent No.: US 11,133,510 B2
(45) Date of Patent: Sep. 28, 2021

(54) ANODE FOR AN ELECTROCHEMICAL CELL AND METHOD FOR PRODUCING AN ELECTROCHEMICAL CELL COMPRISING SUCH AN ANODE

(71) Applicant: FRAUNHOFER-GESELLSCHAFT ZUR FOERDERUNG DER ANGEWANDTEN FORSCHUNG E.V., Munich (DE)

(72) Inventors: Nikolai Trofimenko, Dresden (DE); Mihails Kusnezoff, Dresden (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 153 days.

(21) Appl. No.: 16/464,060

(22) PCT Filed: Nov. 23, 2017

(86) PCT No.: PCT/EP2017/080170
§ 371 (c)(1),
(2) Date: May 24, 2019

(87) PCT Pub. No.: WO2018/096022
PCT Pub. Date: May 31, 2018

(65) Prior Publication Data
US 2019/0386320 A1    Dec. 19, 2019

(30) Foreign Application Priority Data
Nov. 25, 2016    (DE) ............... 10 2016 223 414.5

(51) Int. Cl.
*H01M 4/90*    (2006.01)
*G01N 27/30*    (2006.01)
(Continued)

(52) U.S. Cl.
CPC ......... *H01M 4/9066* (2013.01); *C25B 11/031* (2021.01); *C25B 11/091* (2021.01);
(Continued)

(58) Field of Classification Search
CPC ...... H01M 4/9066; H01M 8/10; C25B 11/035
See application file for complete search history.

(56) References Cited

U.S. PATENT DOCUMENTS

| | | | |
|---|---|---|---|
| 2011/0039183 A1 | 2/2011 | Armstrong et al. | |
| 2013/0143141 A1* | 6/2013 | Kim ................... | B23K 35/302 429/468 |
| 2014/0023957 A1* | 1/2014 | Brandner ............ | H01M 8/0236 429/509 |

FOREIGN PATENT DOCUMENTS

| | | |
|---|---|---|
| DE | 102013007637 | 10/2014 |
| JP | 2011216464 | 12/2011 |

OTHER PUBLICATIONS

Machine Translation of JP 2011216464A (Dec. 11, 2020) (Year: 2020).*

(Continued)

*Primary Examiner* — Matthew J Merkling
(74) *Attorney, Agent, or Firm* — Jacobson Holman PLLC

(57) ABSTRACT

The invention relates to an electrode for an electrochemical cell, wherein an electrode is flatly applied onto a surface of a solid oxide electrolyte, and a cathode is flatly applied onto the solid oxide electrolyte surface opposite the electrode. The base material of the electrode is a composite whose catalytically active metal component contains a nickel phase which is made of NiO as part of the electrode starting material by reducing the NiO in a hydrogen-containing atmosphere. The ceramic component is made with a doped cerium oxide and a spinel made of at least one transition metal selected from Ni, Mn, Fe, and Cr.

19 Claims, 5 Drawing Sheets

(51) Int. Cl.
    *H01M 4/86*         (2006.01)
    *H01M 4/88*         (2006.01)
    *C25B 11/031*     (2021.01)
    *C25B 11/091*     (2021.01)
    *H01M 8/124*      (2016.01)

(52) U.S. Cl.
    CPC .......... *G01N 27/30* (2013.01); *H01M 4/8642* (2013.01); *H01M 4/8657* (2013.01); *H01M 4/8828* (2013.01); *H01M 4/8885* (2013.01); *H01M 4/9033* (2013.01); *H01M 2004/8684* (2013.01); *H01M 2008/1293* (2013.01)

(56) References Cited

OTHER PUBLICATIONS

Faes et al. A Review of RedOx Cycling of Solid Oxide Fuel Cells Anode, In: Membranes, vol. 2, 2012, No. 3, S. 585-664.

Pippardt et al. Performance and Stability of Mixed Conducting Composite Membranes Based on Substituted Ceria. In: J. Ceram. Sci. Tech., vol. 5, 2014, No. 4, S. 309-316.

Hua et al. Methane On-Cell Reforming by Allows Reduced from $Ni0.5Cu0.5Fe2O4$ for Direct-Hydrocarbon Solid Oxide Fuel Cells. Journal of the Electrochemical Society, vol. 161, No. 4, Mar. 1, 2014, pp. F569-575.

Jin et al. Intermediate temperature solid oxide fuel cells with $Cu1.3Mn1.7O4$ internal reforming layer. Journal of Power Sources, vol. 201, Nov. 6, 2011, pp. 66-71.

\* cited by examiner

ANODE FOR AN ELECTROCHEMICAL CELL AND METHOD FOR PRODUCING AN ELECTROCHEMICAL CELL COMPRISING SUCH AN ANODE

BACKGROUND OF THE INVENTION

The invention relates to an electrode for an electrochemical cell having an oxygen ion conductor solid electrolyte, a process for producing an electrochemical cell having such an electrode.

Electrochemical cells are usually used for the transformation of chemical energy into electric energy or vice versa. Chemical redox reactions also occur here, and these usually have adverse effects on the resistance of the cells and thus the efficiency and the life during the time of operation. This affects, in particular, the electrode which is in contact with the fuel gas.

This also applies to electrochemical cells in which the electrolyte comprises a solid oxide and which are operated at elevated temperatures above 700° C.

In the constructions of these electrochemical cells known hitherto, the achievable power density has been limited as a result of the sintering temperature above 1250° C. required for the electrode materials used, which consist of NiO and a solid electrolyte phase. At lower sintering temperatures, it has hitherto not been possible to achieve satisfactory adhesion of the electrode material. In addition, a smaller electrochemically active interface between nickel particles and the solid electrolyte particles in the electrode is formed at these high sintering temperatures, which is due to the larger particle sizes and the higher sintering temperature.

Furthermore, the mechanical stability or strength of the electrolyte material is reduced by diffusion of Mn from the air electrode, which is located opposite the electrolyte material and is often fired in by cosintering, into stabilized $ZrO_2$ at high sintering temperatures.

A further disadvantage of the known electrochemical cells having a solid oxide electrolyte is the increased activity of the electrode for steam reforming of methane in the inlet region of an electrochemical cell, which causes local cooling of the electrochemical cell. This results in large temperature gradients in internal reforming, which can in turn lead to increased mechanical stresses through to destruction of the respective electrochemical cell.

SUMMARY OF THE INVENTION

In order to counter the abovementioned problems, electrodes having a material based on NiO-CGO (nickel oxide-cerium gadolinium oxide) have been used. However, an addition of transition metal oxides leads to an increase in polarization resistance of the electrochemical cell having such an electrode.

Thus, electrodes are described as anodes for solid oxide fuel cells by Faes A. et al. in "A Review of RedOx Cycling of Solid Oxide Fuel Cells Anode"; Membranes; Vol. 2; 2012; No. 3; pp. 585-664—ISNN 2077-0375.

DE 10 2013 007 637 A1 relates to a cathode-electrolyte-anode assembly of high-temperature fuel cells.

Oxygen-permeable membranes have been discussed by U. Pippadt, et al. in "Performance and Stability of Mixed Conducting Composite Membranes of Substituted Ceria"; J. Ceram. Sci. Tech.; Vol. 5; 2014; No. 4; p. 309-316.

It is therefore an object of the invention to provide electrochemical cells which both in the fuel cell mode and in the electrolysis mode (including the use with gas mixtures consisting of water vapor/carbon dioxide) have increased redox stability, reduced activity for internal reforming and improved catalytic long-term stability and thus reduced performance degradation.

According to the invention, this object is achieved by an electrode for an electrochemical cell, and a process for producing electrochemical cells having such an electrode as set forth in the claims.

In the cell according to the invention, an electrode is applied to a surface of a solid oxide electrolyte and a further electrode is applied to the surface of the solid oxide electrolyte opposite the electrode, in each case over the area. The base material of the electrode on the side which is exposed to $H_2$ or an H-containing chemical compound, in particular a gas mixture containing $H_2$, is a composite whose metallic and catalytically active constituent contains a nickel phase which is formed from the NiO as constituent of the electrode starting material by reduction in a hydrogen-containing atmosphere. The ceramic constituent comprises a doped cerium oxide and a spinel comprising at least one transition metal selected from among Ni, Mn, Fe, Co and Cr.

A spinel having the chemical formula $(Cu_xNi_{1-x})_y(Mn_{1-z}M'_z)_2O_4$ where $0 \leq x \leq 1.0$, $0.8 \leq y \leq 1.2$, $0 \leq z \leq 1$ and $M'$=Fe, Co or Cr can advantageously be present in the electrode material. Here, the spinel should be present in a proportion in the range from 0.01% by volume to 15% by volume in the electrode material. The proportion should advantageously be 10% by volume, particularly advantageously 5% by volume and very particularly advantageously 0.5% by volume.

The cerium oxide should be stabilized with a metal oxide from the group consisting of the rare earth metals, in particular gadolinium oxide or samarium oxide.

The electrode can particularly advantageously have a multilayer structure in which the individual layers are joined to one another by material-to-material bonding and have a different consistency and porosity. Here, a first layer which is formed on the surface of the solid electrolyte can have a lower porosity, a smaller proportion of nickel and a smaller proportion of spinel than at least one further layer present in the electrode.

The electrode can very particularly advantageously have at least three layers of which the first layer forms an electrode layer, a second layer arranged in the middle forms an active electrode layer and a third layer forms an electrode contact layer, where the second layer has a higher porosity, a greater proportion of nickel and a greater proportion of spinel than the first layer and the third layer has a greater proportion of nickel and a smaller proportion of spinel than the second layer. In this context, the first layer should have a porosity of not more than 15% by volume, a maximum proportion of nickel of 15% by volume and a maximum proportion of spinel of 10% by volume and the second layer should have a porosity of at least 30%, a proportion of nickel of at least 20% by volume up to a maximum of 70% by volume and a maximum proportion of spinel of 15% by volume and the third layer should have a porosity of at least 30% by volume, a proportion of nickel above 70% by volume and a maximum proportion of spinel of 5% by volume.

In addition, the electrode should have a maximum total thickness of 100 μm.

To produce an electrochemical cell having an electrode according to the invention, a viscous suspension in which the composite whose catalytically active constituent contains a nickel phase and whose ceramic constituent comprises a powder mixture comprising a doped cerium oxide and a spinel comprising at least one transition metal selected from among Ni, Mn, Fe, Co and Cr and at least one liquid are present is applied in a constant layer thickness to a surface of a support or of the solid oxide electrolyte. A heat treatment in which liquid and/or organic components are removed and sintering is achieved with simultaneous formation of a material-to-material bond to the respective surface of the support or solid oxide electrolyte is subsequently carried out.

During the sintering of the electrode material, partial decomposition of the mixed oxide occurs and diffusion of cations into the NiO and CGO occurs. In the initialization (first start-up) of the respective electrochemical cell under a reducing atmosphere (in hydrogen/water vapor) at elevated temperature (in particular in the range from 800° C. to 950° C.), decomposition of the spinel $(Cu_xN_{1-x})_y(Mn_{1-z}M'_z)_2O_4$ into oxidic constituents and metallic copper and also the reduction of NiO to metallic nickel then occurred. Oxidic constituents react with CGO and copper forms a nickel alloy with the nickel. Improved adhesion between individual particles in the electrode material can be achieved in this way. In addition, a higher porosity can be attained at a lower required sintering temperature as a result of decomposition of the mixed oxide phase. Increased sulfur resistance can also be achieved with the Ni—Cu alloy formed.

The suspension can, for example, be applied to the surface of the support or the solid oxide electrolyte by means of screen printing, spin coating, wet powder spraying, doctor blade methods, ink jet printing, 3D printing before carrying out the heat treatment.

To form an electrode having a plurality of layers, the plurality of layers should be applied by successive application and drying with in each case a different consistency on top of one another to the surface of the support or of the solid oxide electrolyte before carrying out the heat treatment.

Different liquids and/or optionally an organic binder can be used for producing the suspension. In addition, a surfactant can also be present in the suspension. It is advantageous for the powder mixture to be homogeneously dispersed in the suspension and thus to be able to be applied to the respective surface so that a homogeneous distribution of the pulverulent materials in the volume of the electrode or the individual layers making up an electrode is obtained. To influence the porosity, organic constituents which can perform the function of space reservers can be present in the suspension. The porosity can also be solely or additionally influenced by means of the particle size of the powder mixture used. Here, the porosity can be increased when using larger particle sizes.

As material for the solid electrolyte, it is possible to use $Y_2O_3$-stabilized $ZrO_2$, $Yb_2O_3$-stabilized $ZrO_2$ or $Sc_2O_3$-stabilized $ZrO_2$ with addition of $CeO_2$. An electrode of an electrochemical cell which comes into contact with oxygen, air or another oxygen-containing chemical compound or an oxygen-containing gas mixture can comprise $(La,Sr)(Mn, Fe,Co)O_3$ or $(La,Sr)(Fe,Co)O_3$ as perovskite and $Y_2O_3$, $Sc_2O_3$ or $Y_2O_3$-stabilized $ZrO_2$ or $Gd_2O_3$— or $Sm_2O_3$-stabilized $CeO_2$, as is also the case in the prior art.

The electrochemical cell provided with an electrode according to the invention should, after reduction in an $H_2/H_2O$ gas mixture, have a sufficient conductivity for ions and electrons at an operating temperature in the range from 700° C. to 950° C.

A conventional electrode of an electrochemical cell (G3) can withstand more than 20 redox cycles at a power loss of less than 0.5%.

The redox stability of an electrochemical cell having an electrode according to the invention (G6) is considerably improved and it was possible to observe a power increase of 0.7% after 25 redox cycles. A power degradation of 0.6% occurred only after 43 redox cycles. After 75 redox cycles, it was only 4.3% (FIG. 3).

The electrical resistance of an electrochemical cell equipped according to the invention can be reduced by up to 30% compared to conventional cells (FIG. 1a and FIG. 1b). The polarization resistance of the electrodes can be reduced by up to 60% depending on the respective operating temperature of the respective cell (FIG. 2a and FIG. 2b).

It is also possible to achieve operation using a proportion of methane in the fuel which is increased compared to previously known possibilities in operation as fuel cell and thus increased system efficiency.

When the electrode is used in a solid oxide fuel cell, the electrode forms an anode, and when it is used in a solid oxide electrolysis cell, the electrode forms a cathode. An electrode according to the invention can also be used in a solid oxide sensor.

DESCRIPTION OF THE FIGURES

The invention will be illustrated by way of example below.

FIG. 1 consists of FIG. 1A and FIG. 1B.

FIG. 2 consists of FIG. 2A and FIG. 2B.

DESCRIPTION OF THE INVENTION

The following starting materials are used for production of the electrodes:
  a pulverulent charge-compensated composition in respect of the particular concentration of Gd3+ with $Ce_{0.8}Gd_{0.2}O_{1.9}$ or $Ce_{0.8}Gd_{0.1}O_{1.95}$—(CGO), having an average particle size $d_{50}$ of <2.0 µm, in particular $d_{50}$ of <0.5 µm,
  a pulverulent NiO having an average particle size $d_{50}$ of <5.0 µm, in particular $d_{50}$ of <2.5 µm,
  a pulverulent Cu-, Ni- and Mn-containing spinel, in particular $CudNi_{0.4}Mn_2O_4$ or $Cu_{0.8}Ni_{0.2}Mn_2O_4$ (CNM) having an average particle size $d_{50}$ of <5.0 µm, in particular $d_{50}$ of <2.5 µm.

The powders (CGO, NiO, CNM) are mixed with one another in the appropriate ratio and subjected to various milling, mixing, dispersing, drying, sieving and rolling steps and processed with an organic binder (e.g. polyvinyl butyral resin (PVB) or ethyl cellulose (EC)) and additives (organic wetting agents, dispersants and pore formers) to give a screen-printable paste. Three pastes having different ratios of the solids (CGO:NiO:CNM) are produced. The production parameters should be selected so that the desired properties, e.g. storage stability, good screen printing behavior, freedom from cracks on drying of the printed layers, and also the porosity of the layer after sintering required for the electrochemical activity are obtained.

Figure 1A:
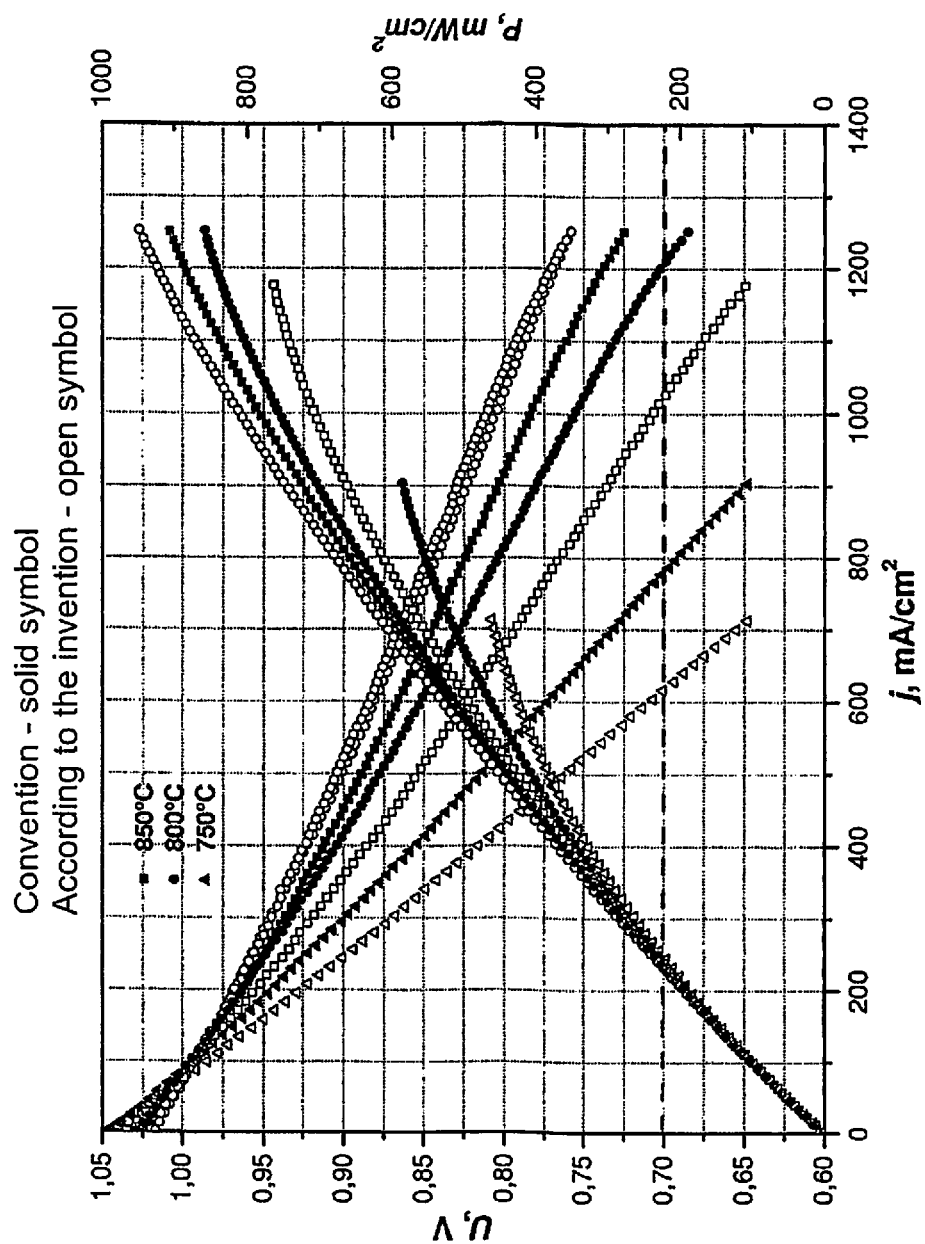
FIG. 1A is a graph depicting the ratios of achievable electric potentials or specific electric power per unit area and electric current per unit area for electrochemical cells having conventional electrodes and electrodes according to the invention at various operating temperatures.
Figure 1B:
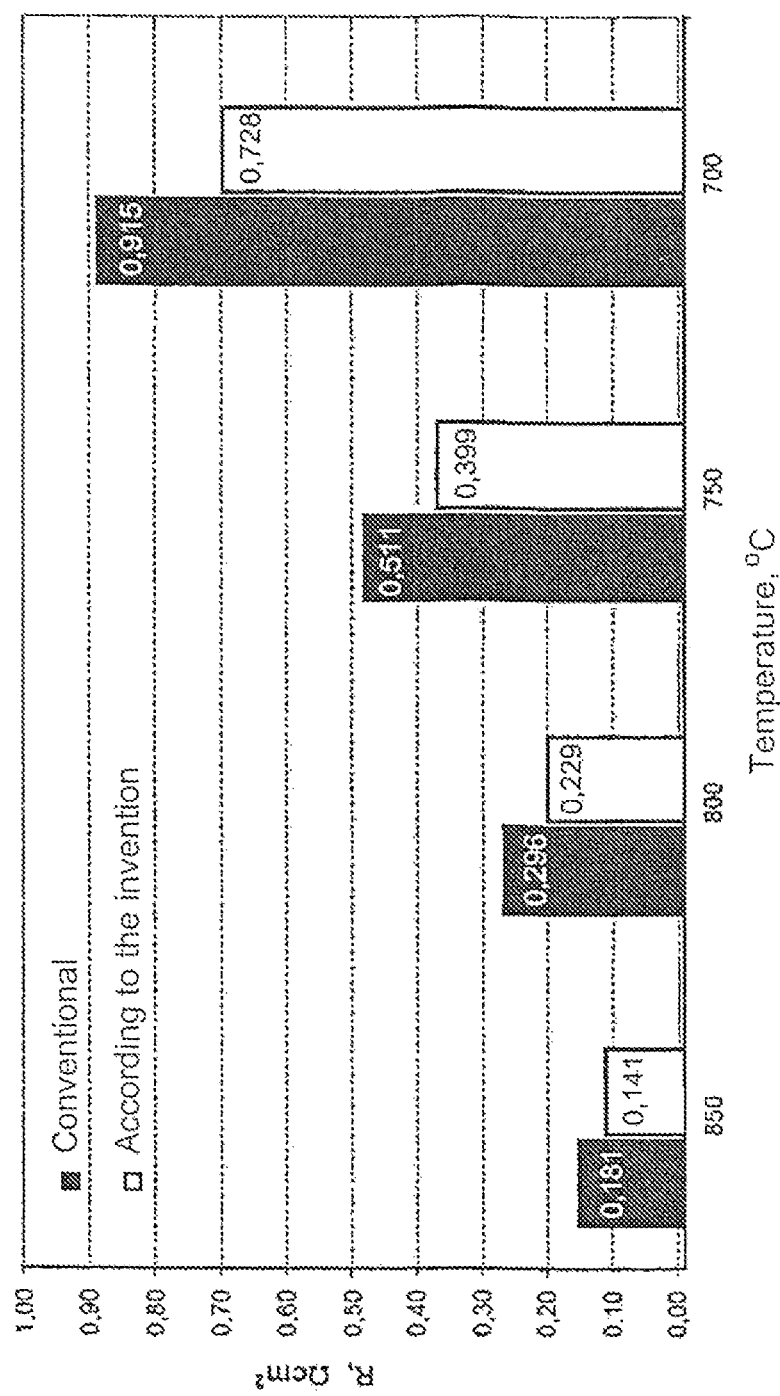
FIG. 1B is a graph of the electrical sheet resistance for electrochemical cells having conventional electrodes and electrodes according to the invention at various operating temperatures.
Figure 2A:
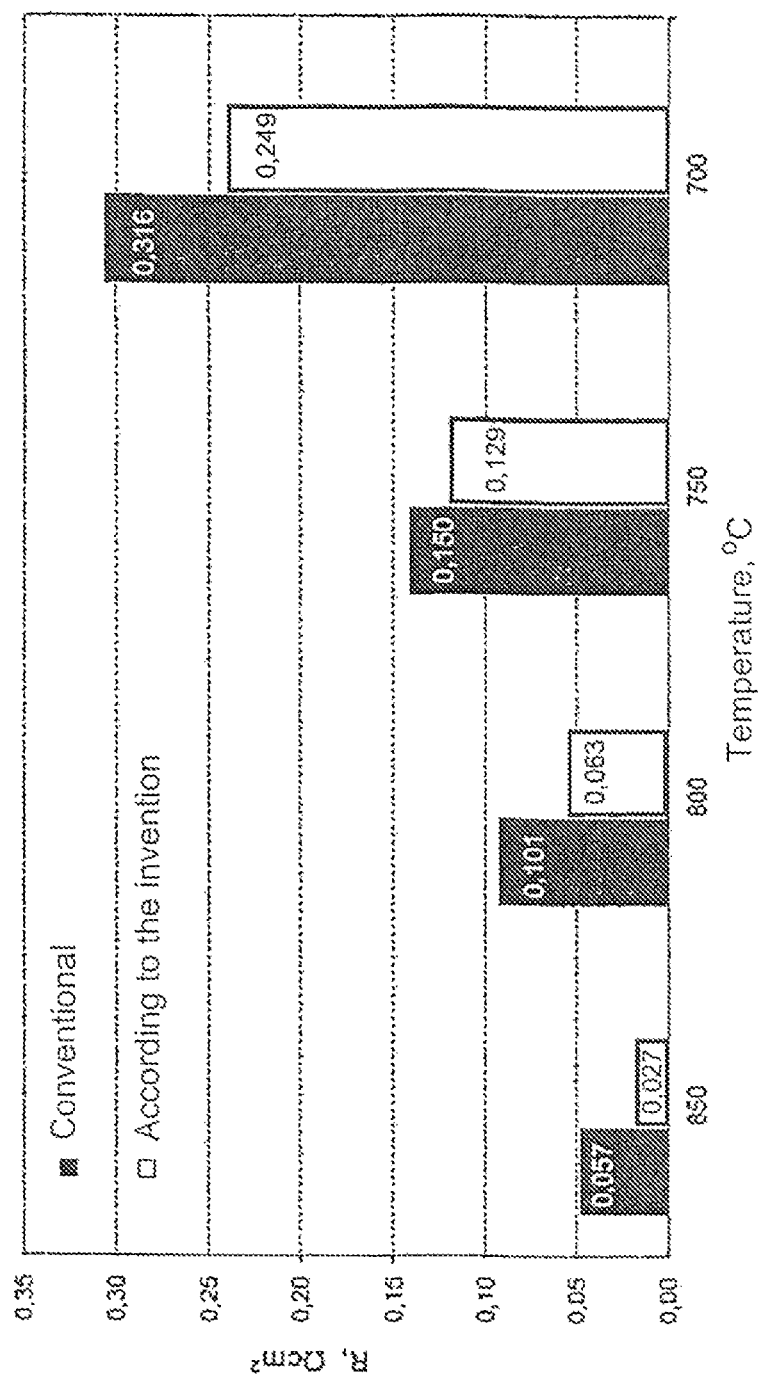
FIG. 2A is a graph of the electrical sheet resistance for electrochemical cells having conventional electrodes and electrodes according to the invention at various operating temperatures compared to operation in the fuel cell operation mode with conventional anode and anode according to the invention.
Figure 2B:
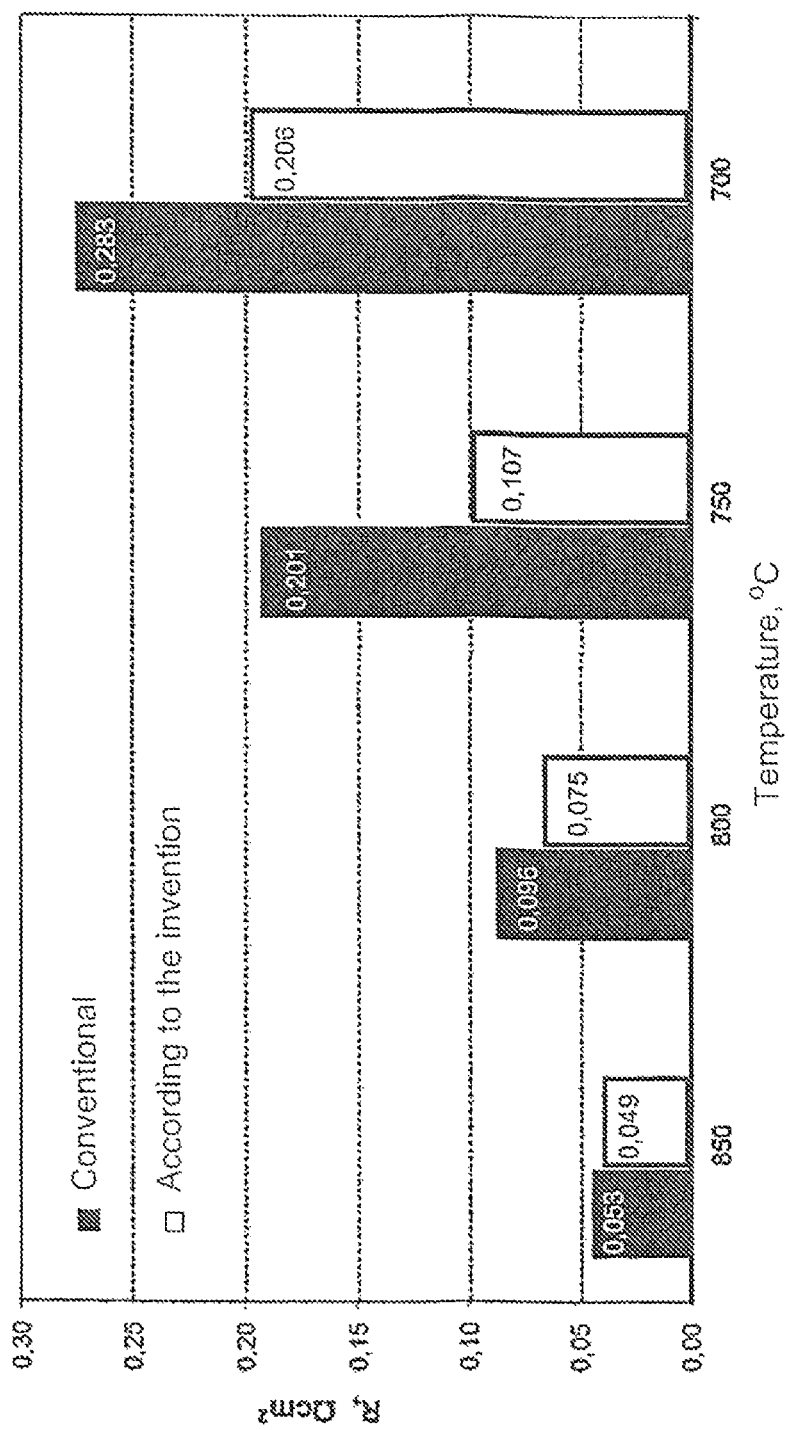
FIG. 2B a graph of the electrical sheet resistance of the cathode for electrochemical cells having conventional electrodes and electrodes according to the invention at various operating temperatures compared to operation in the fuel cell operation mode with conventional anode and anode according to the invention.
Figure 3:
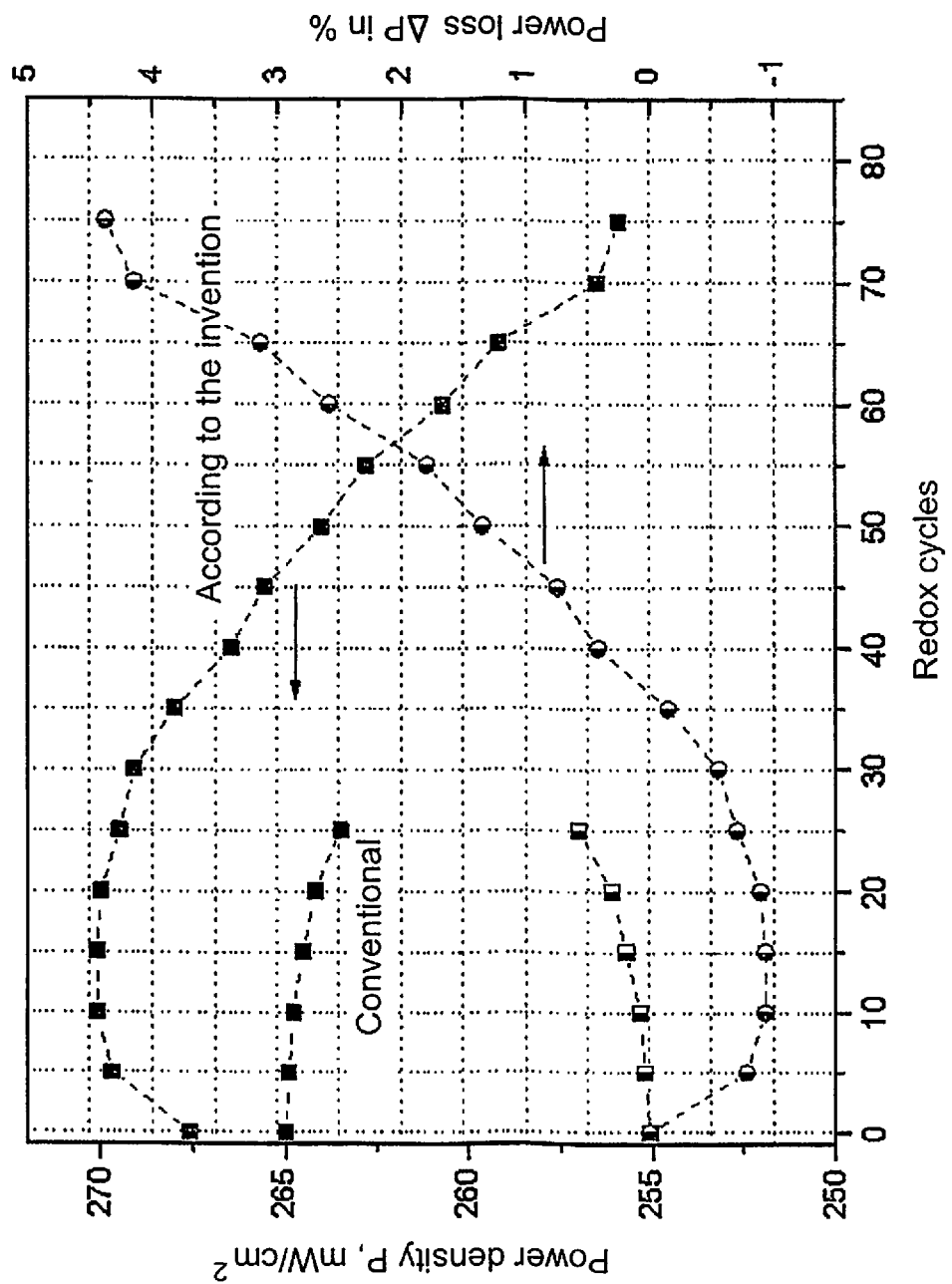
FIG. 3 a graph which depicts the change in the power density at the same operating point in the fuel cell operation mode by redox cycles or power losses suffered in % for electrochemical cells with conventional electrode and electrode according to the invention.

The pastes are applied sequentially in a plurality of superposed layers to the electrolyte substrate by means of screen printing and dried. Here, a layer is firstly treated using a paste which has the lowest proportion of NiO (Ni:CGO:CNM=12:87:1 in % by volume), a layer is printed thereon using a paste having the intermediate proportion of NiO (Ni:CGO:CNM=58:40:2 in % by volume) and a layer is lastly printed on top of the middle layer using a paste having the highest proportion of NiO (Ni:CGO:CNM=87:11:2 in % by volume). The layers of the electrode which come into contact with oxygen or an oxygen-containing gas or gas mixture (known as air electrode) are subsequently likewise printed sequentially on the opposite side of the electrolyte and dried. The coated electrolyte substrates with dried electrode layers are sintered jointly in air in the cofiring process. The sintering temperature of the CGO/NiO/CNM electrodes is in the range from 1150° C. to 1250° C. As a result, an electrochemical cell having well-adhering layers for fuel gas electrode and air electrode is obtained. The cell can then be built in this state to form a cell stack. Before operation, an $H_2/N_2$ mixture is fed into the stack at the operating temperature and NiO is reduced to Ni and spinel is reduced to Ni, Cu and MnO in the fuel gas electrode (electrode which comes into contact with $H_2$ or an $H_2$-containing gas or gas mixture). In the reduction phase, MnO forms a mixed oxide with the CGO and Cu alloys the Ni present in the electrode. After this operation, an electrode having improved redox stability and having a relatively low electrical internal resistance, as is shown by way of example in FIG. 1-3, is obtained. Here, it is particularly important that the porosity of the first layer is in the range 10%-15%, that of the second layer which is arranged between first and third layer is in the range 30%-45% and that of the third layer is in the range 35%-45% in order to attain a high power density and redox stability.

The invention claimed is:

1. An electrode for an electrochemical cell, wherein an electrode has been applied to a surface of a solid oxide electrolyte and a cathode has been applied to the surface of the solid oxide electrolyte opposite the electrode, in each case over an area, and
   a base material of the electrode is a composite whose metallic and catalytically active constituent contains a nickel phase which has been formed from NiO as a constituent of the electrode starting material by reduction of the NiO in a hydrogen-containing atmosphere and
   whose ceramic constituent comprises a doped cerium oxide and a spinel comprising at least one transition metal selected from among Ni, Mn, Fe or Cr; where
   the electrode is an anode in a solid oxide fuel cell, or an electrode in a solid oxide sensor, wherein the electrode is formed by a multilayer structure in which the individual layers are joined to one another by material-to-material bonding and have a different consistency and porosity and a first layer which is formed on the solid oxide electrolyte surface has a lower porosity, a smaller proportion of nickel and a smaller proportion of spinel than at least one further layer present in the electrode.

2. The electrode as claimed in claim 1, wherein the spinel having the chemical formula $(Cu_xNi_{1-x})_y(Mn_{1-z}M'_z)_2O_4$ where $0 \leq x \leq 1.0$, $0.8 \leq y \leq 1.2$, $0 \leq z \leq 1$ and M'=Fe, Co or Cr is present in the electrode material.

3. The electrode as claimed in claim 1, wherein the spinel is present in a proportion in the range from 0.01% by volume to 15% by volume in the electrode material.

4. The electrode as claimed in claim 1, wherein the doped cerium oxide is stabilized with a group consisting of rare earth metals, selected from gadolinium oxide or samarium oxide.

5. The electrode as claimed in claim 1, wherein the electrode has a maximum total thickness of 100 µm.

6. A process for producing an electrochemical cell having an electrode as claimed in claim 1, wherein a viscous suspension in which the composite whose metallic and catalytically active constituent contains the nickel phase formed from the NiO as a constituent of the electrode starting material by reduction in the hydrogen-containing atmosphere and whose ceramic constituent comprises a powder mixture comprising the doped cerium oxide and the spinel comprising the at least one transition metal selected from among Ni, Mn, Fe, Co or Cr and at least one liquid being present is applied in a constant layer thickness to a surface of a support or of the solid oxide electrolyte and a heat treatment in which the liquid or organic components are removed and sintering is achieved with simultaneous formation of a material-to-material bond to the respective surface of the support or solid oxide electrolyte is subsequently carried out and the anode of the solid oxide fuel cell, the cathode of a solid oxide electrolysis cell or the electrode for a solid oxide sensor is produced by the process.

7. The process as claimed in claim 6, wherein a maximum temperature of 1250° C. is adhered to in the heat treatment.

8. The process as claimed in claim 6, wherein the viscous suspension is applied to the surface of the support or of the solid oxide electrolyte by means of screen printing, spin coating, wet powder spraying, doctor blade processes, ink jet printing or 3D printing before carrying out the heat treatment.

9. The process as claimed in claim 6, wherein a plurality of layers are applied on top of one another, each layer having a different consistency, the layers being applied on the surface of the support or of the solid oxide electrolyte by successive application and drying before carrying out the heat treatment.

10. An electrode for an electrochemical cell, wherein an electrode has been applied to a surface of a solid oxide electrolyte and a cathode has been applied to the surface of the solid oxide electrolyte opposite the electrode, in each case over an area, and
   a base material of the electrode is a composite whose metallic and catalytically active constituent contains a nickel phase which has been formed from NiO as a constituent of the electrode starting material by reduction of the NiO in a hydrogen-containing atmosphere and
   whose ceramic constituent comprises a doped cerium oxide and a spinel comprising at least one transition metal selected from among Ni, Mn, Fe or Cr; where
   the electrode is an anode in a solid oxide fuel cell, or an electrode in a solid oxide sensor, wherein the electrode comprises at least three layers of which a first layer forms an electrode layer, a second layer arranged in the middle forms an active electrode layer and a third layer forms an electrode contact layer, where the second layer has a higher porosity, a greater proportion of nickel and a greater proportion of spinel than the first layer and the third layer has a higher porosity, a greater proportion of nickel and smaller proportion of spinel than the second layer.

11. The electrode as claimed in claim 10, wherein the spinel having the chemical formula $(Cu_xNi_{1-x})_y(Mn_{1-z}M'_z)_2O_4$ where $0 \leq x \leq 1.0$, $0.8 \leq y \leq 1.2$, $0 \leq z \leq 1$ and M'=Fe, Co or Cr is present in the electrode material.

12. The electrode as claimed in claim 10, wherein the spinel is present in a proportion in the range from 0.01% by volume to 15% by volume in the electrode material.

13. The electrode as claimed in claim 10, wherein the doped cerium oxide is stabilized with a group consisting of rare earth metals, selected from gadolinium oxide or samarium oxide.

14. The electrode as claimed in claim 10, wherein the electrode has a maximum total thickness of 100 μm.

15. An electrode for an electrochemical cell, wherein an electrode has been applied to a surface of a solid oxide electrolyte and a cathode has been applied to the surface of the solid oxide electrolyte opposite the electrode, in each case over an area, and
a base material of the electrode is a composite whose metallic and catalytically active constituent contains a nickel phase which has been formed from NiO as a constituent of the electrode starting material by reduction of the NiO in a hydrogen-containing atmosphere and
whose ceramic constituent comprises a doped cerium oxide and a spinel comprising at least one transition metal selected from among Ni, Mn, Fe or Cr; where
the electrode is an anode in a solid oxide fuel cell, or an electrode in a solid oxide sensor, wherein the electrode comprises at least three layers, a first layer has a porosity of not more than 15%, a maximum proportion of nickel of 15% and a maximum proportion of spinel of 10% and a second layer has a porosity of at least 30%, a proportion of nickel of at least 20% to a maximum of 70% and a maximum proportion of spinel of 15% and a thermal layer has a porosity of at least 30%, a proportion of nickel above 70% and a maximum proportion of spinel of 5%.

16. The electrode as claimed in claim 15, wherein the spinel having the chemical formula $(Cu_xNi_{1-x})_y(Mn_{1-z}M'_z)_2O_4$ where $0 \leq x \leq 1.0$, $0.8 \leq y \leq 1.2$, $0 \leq z \leq 1$ and M'=Fe, Co or Cr is present in the electrode material.

17. The electrode as claimed in claim 15, wherein the spinel is present in a proportion in the range from 0.01% by volume to 15% by volume in the electrode material.

18. The electrode as claimed in claim 15, wherein the doped cerium oxide is stabilized with consisting of rare earth metals, selected from gadolinium oxide or samarium oxide.

19. The electrode as claimed in claim 10, wherein the electrode has a maximum total thickness of 100 μm.

\* \* \* \* \*